(12) United States Patent
Head et al.

(10) Patent No.: US 10,523,077 B2
(45) Date of Patent: Dec. 31, 2019

(54) VERY HIGH TEMPERATURE ELECTRICAL WINDING

(71) Applicant: COREteQ Systems Ltd., Bagshot (GB)

(72) Inventors: Philip Head, Virginia Water (GB); Hassan Mansir, Maidenhead (GB)

(73) Assignee: Coreteq System Ltd., Surrey (GB)

(*) Notice: Subject to any disclaimer, the term of this patent is extended or adjusted under 35 U.S.C. 154(b) by 572 days.

(21) Appl. No.: 15/036,136

(22) PCT Filed: Nov. 17, 2014

(86) PCT No.: PCT/EP2014/074798
§ 371 (c)(1),
(2) Date: May 12, 2016

(87) PCT Pub. No.: WO2015/071466
PCT Pub. Date: May 21, 2015

(65) Prior Publication Data
US 2016/0294242 A1 Oct. 6, 2016

(30) Foreign Application Priority Data
Nov. 15, 2013 (GB) .................................. 1320245.2

(51) Int. Cl.
*H02K 3/30* (2006.01)
*H02K 3/34* (2006.01)

(52) U.S. Cl.
CPC .............. *H02K 3/345* (2013.01); *H02K 3/30* (2013.01)

(58) Field of Classification Search
CPC ............ H02K 3/34; H02K 3/30; H02K 3/345; H02K 15/0068

USPC .................................................. 310/179–210
See application file for complete search history.

(56) References Cited

U.S. PATENT DOCUMENTS

| 1,469,304 A | 10/1923 | Hughes |
| 1,960,484 A | 5/1934 | Ekstromer |
| 2,240,569 A | 5/1941 | Myers |

(Continued)

FOREIGN PATENT DOCUMENTS

| CN | 101227127 A1 | 7/2008 |
| CN | 101873043 A | 10/2010 |

(Continued)

OTHER PUBLICATIONS

G2 Consult: "Theory & Practice of Electromagnetic Design of DC Motors & Actuators", Internet, Nov. 16, 2012, retrieved from the Internet Jan. 22, 2016: URL: https://web.archive.org/web/20120116070129/http://www.consult-g2.com/course/chapter8/chapter.html ; 5 pgs.

(Continued)

*Primary Examiner* — Naishadh N Desai
(74) *Attorney, Agent, or Firm* — Fay Sharpe LLP

(57) ABSTRACT

A stator has a field winding, the winding comprising a plurality of axial conductors connected at their ends to form at least one circuit with a number of turns. Each axial conductor, or set of axial conductors having a common voltage, is disposed within an insulated channel member, the insulated channel member being disposed within a stack of laminations. The axial conductors and the tubular insulation members are radially distributed at equal angles.

19 Claims, 17 Drawing Sheets

(56) References Cited

U.S. PATENT DOCUMENTS

| | | | | |
|---|---|---|---|---|
| 4,131,815 A * | 12/1978 | Boatright | ............ | E21B 47/101 310/323.21 |
| 4,558,406 A * | 12/1985 | Geissler | ................ | H01F 27/40 336/61 |
| 4,570,097 A * | 2/1986 | Shukla | .................... | G01L 9/008 310/319 |
| 5,164,626 A * | 11/1992 | Oigawa | ................... | F24H 1/225 310/208 |
| 5,682,074 A | 10/1997 | Di Pietro et al. | | |
| 6,310,427 B1 * | 10/2001 | Culbert | ............... | B06B 1/0655 310/334 |
| 8,450,898 B2 * | 5/2013 | Sears | .................... | H02K 3/522 310/194 |
| 8,736,127 B2 * | 5/2014 | Schlote | .................. | H02K 3/12 29/596 |
| 2002/0066568 A1 | 6/2002 | Buchanan | | |
| 2002/0079763 A1 | 6/2002 | Fleshman et al. | | |
| 2002/0125783 A1 * | 9/2002 | Morinigo | ............. | H02K 19/103 310/179 |
| 2003/0102765 A1 * | 6/2003 | Knoll | ..................... | H02K 1/146 310/179 |
| 2004/0189136 A1 * | 9/2004 | Kolomeitsev | .......... | H02K 1/148 310/216.082 |
| 2006/0066181 A1 * | 3/2006 | Bromfield | ............ | H01L 41/047 310/363 |
| 2006/0267439 A1 * | 11/2006 | Rajasingham | ........... | H02K 3/12 310/179 |
| 2008/0197724 A1 * | 8/2008 | Cullen | .................... | H02K 3/24 310/53 |
| 2008/0211322 A1 * | 9/2008 | Heinrich | .................. | H02K 3/14 310/12.18 |
| 2008/0247059 A1 * | 10/2008 | Dong | .................... | G02B 7/102 359/696 |
| 2009/0184598 A1 | 7/2009 | Nakano | | |
| 2010/0045134 A1 * | 2/2010 | Ciampolini | .............. | B60K 6/20 310/201 |
| 2011/0017906 A1 * | 1/2011 | Matsukawa | .............. | G02B 7/08 250/234 |
| 2011/0115314 A1 * | 5/2011 | Du | ........................ | H02K 1/148 310/50 |
| 2011/0316468 A1 | 12/2011 | Makki et al. | | |
| 2013/0069478 A1 * | 3/2013 | Hamer | .................... | H02K 3/30 310/215 |

FOREIGN PATENT DOCUMENTS

| | | |
|---|---|---|
| DE | 102011120985 A1 | 6/2013 |
| EP | 2112748 A1 | 10/2009 |
| EP | 2573908 A2 | 3/2013 |
| GB | 2438493 A | 11/2007 |
| GB | 2501352 A | 10/2013 |
| JP | S57186966 A | 11/1982 |
| JP | H05 22916 A | 1/1993 |
| JP | H11 299144 A | 10/1999 |
| JP | 2009095193 A | 4/2009 |
| WO | WO2004027211 A1 | 4/2004 |
| WO | WO2015/071468 A3 | 5/2015 |
| WO | WO2015071465 A1 | 5/2015 |
| WO | WO2015071469 A2 | 5/2015 |
| WO | WO2015071470 A1 | 5/2015 |

OTHER PUBLICATIONS

International Search Report and Written Opinion, PCT/EP2014/074798, Completed Jan. 22, 2016, dated Jan. 29, 2016; 9 pages.

* cited by examiner

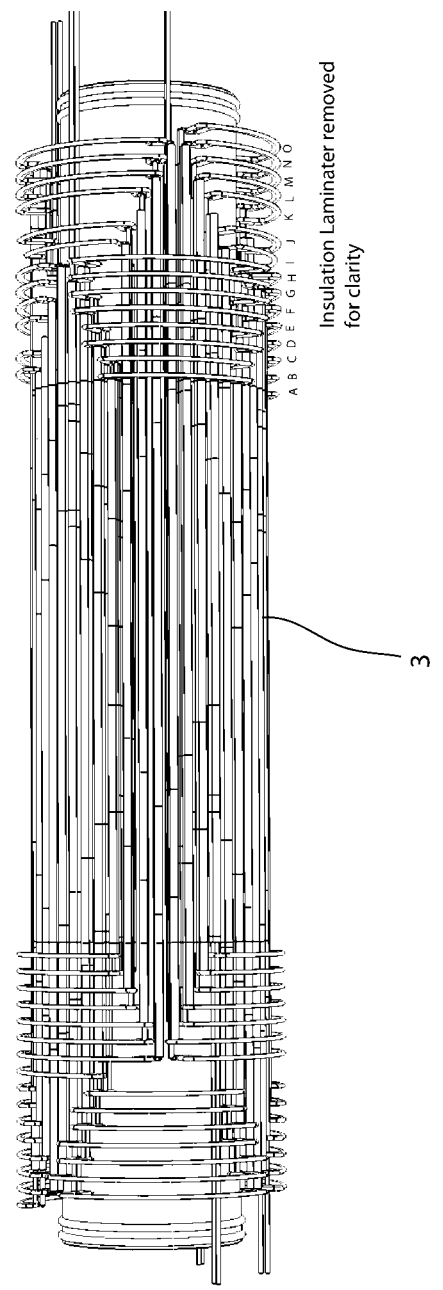

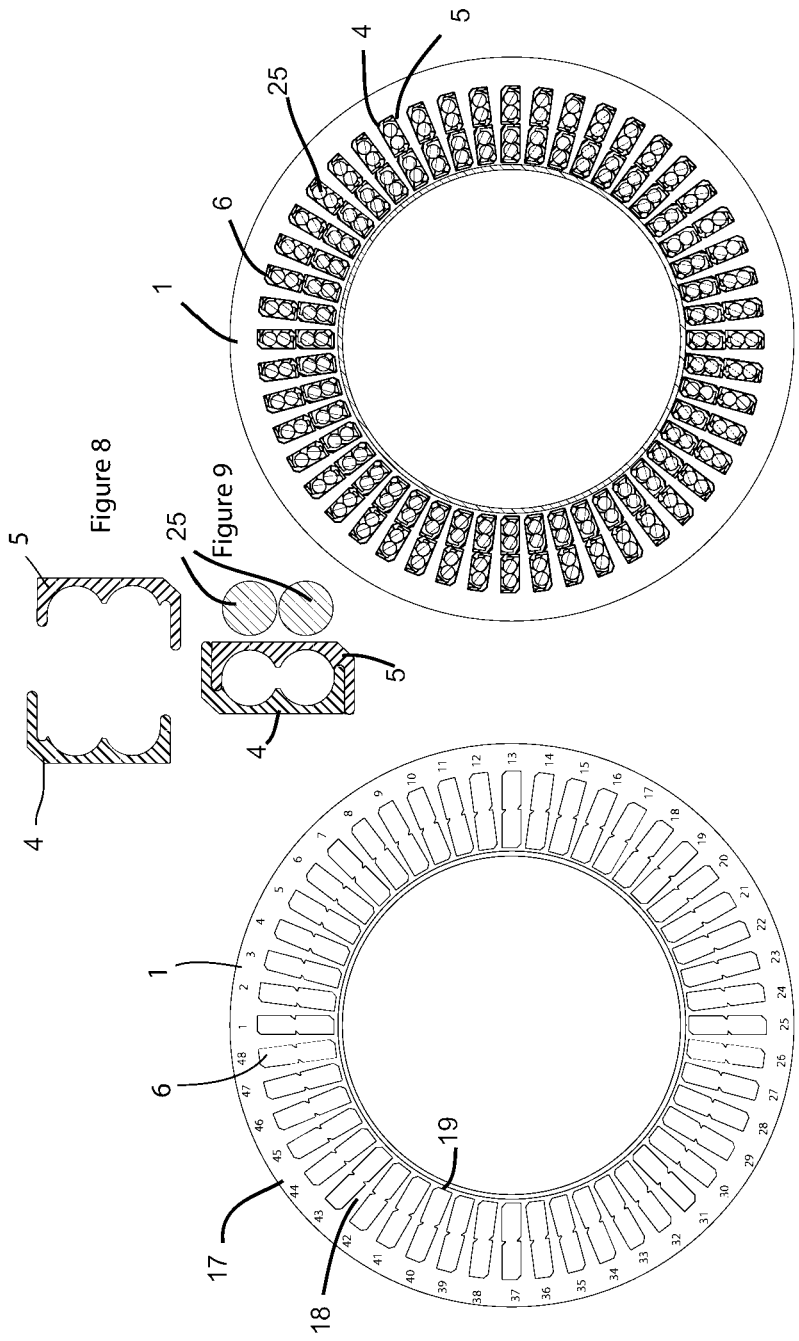

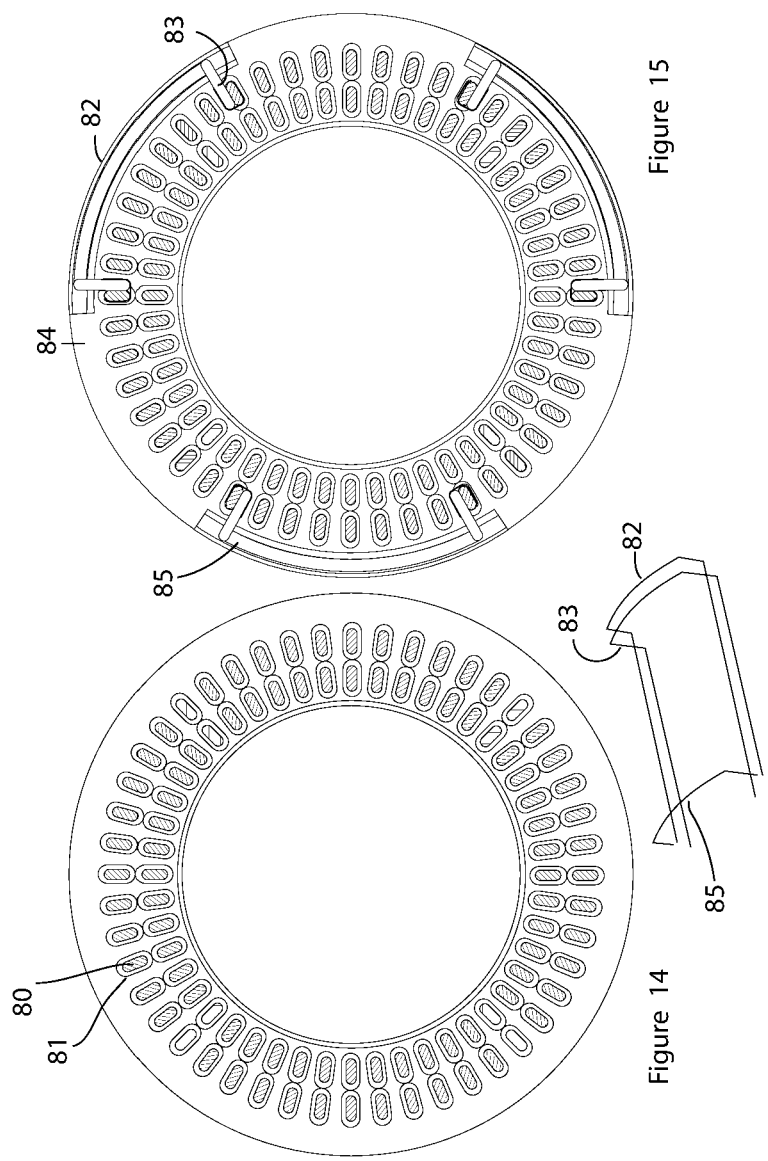

US 10,523,077 B2

VERY HIGH TEMPERATURE ELECTRICAL WINDING

CROSS-REFERENCE TO RELATED APPLICATIONS

This application is a National Stage Entry of PCT/EP2014/074798, and claims priority to, and the benefit of, Great Britain Patent Application No. GB 1320245.2, filed Nov. 15, 2013, the entirety of which is hereby incorporated by reference as if fully set forth herein.

At the present electrical machines comprise one or more electrical conductor windings each of which has a polymeric insulation material. These electrical machines have a maximum operating temperature of the order of 200 C due to the polymeric insulation material applied to the electrical conductor windings.

The use high temperature polymeric insulation material would enable the electrical machines to have a maximum operating temperature of the order of 250 C. However, it is believed that even this stable, oxidation resistant, polymeric insulation material will not have a maximum operating temperature above 300 C.

There is a requirement for electrical machines with maximum temperatures of 500 C and above. These electrical machines for example are active electromagnetic bearings, electrical generators and electrical motors for use within gas turbine engines, particularly on the high-pressure shaft rotor of a gas turbine engine, in oil and gas wells, particularly in steam assisted gravity drainage (SAGD) type heavy oil wells. The use of active electromagnetic bearings may allow the simplification of the rotating machinery by the elimination of conventional bearings and oil systems.

As discussed above polymeric insulation material cannot be used at temperatures above about 300 C. The use of an inorganic insulation material for the electrical conductors is a possibility. The inorganic insulation material may be based on ceramic cloths or ceramic coatings, applied to the electrical conductors. However, this is not desirable because the inorganic insulation material tends to be bulky, limiting the packing density of the electrical conductor, and the electrical conductors also require potting in an inorganic cement, and in addition the manufacturing process is very labour intensive. The use of an inorganic insulation material may be based on ceramic cloth and inorganic cement, however this is not desirable because these inorganic insulation materials have poor thermal conductivity and would make the thermal management of the electrical conductor difficult. Additionally the porous nature of the inorganic cement tends to allow the inorganic insulation material to soak up fluids, for example water, oil or other lubricant. The presence of moisture tends to degrade the electrical insulation by allowing leakage currents to earth or between turns of the electrical conductor. The presence of oil tends to degrade the electrical insulation by forming carbon also allowing leakage currents to earth or between turns of the electrical conductor. Also the thermal expansion mismatch may cause damage to the insulation material during thermal cycling of the electrical conductor.

SUMMARY OF THE INVENTION

According to the present invention, a component of an electric machine is provided according to claim 1.

Ceramic is ideally used to provide insulation for the copper conductor while in the lamination slots, the ceramic maybe a tube through which the copper conductor is threaded, or stackable wafers which sandwich the copper conductor, to enable the copper to bend at the end turn yet not crack the insulation, at each end turn the ceramic tube or sandwich is terminated and a ceramic lamination isolates the copper conductor to enable it to be "turned" to the next slot and then threaded or laid into the ceramic insulated slot. Once the machine is fully wound, the free space around the conductors and ceramic laminations may be filled with magnesium oxide insulation, in either case the windings are hermitically sealed.

According to another aspect of the present invention, there is provided a configuration of windings and ceramic laminations.

This allows the windings to be conveniently turned on the armature in a precise manner, since each conductor position is accurately constrained by the components. There is little of no movement, so wear is reduced. The arrangement is very easy to seal. Ceramic in particular is very suitable as a material, as it has excellent temperature resistance and is hard wearing and resistant to abrasion.

BRIEF DESCRIPTION OF DRAWINGS

The present invention will be more fully described by way of example with reference to the accompanying drawings in which:

FIG. 4 is a side view of FIG. 3

FIG. 6 is an end view of a lamination

FIG. 7 is the same view as FIG. 6 with the slots filled with insulation and copper conductors FIG. 8 is an end view of the ceramic insulation components FIG. 9 is an end view of the ceramic insulation components assembled and the copper conductors adjacent

FIG. 14 is an end view of an alternate motor construction

FIG. 15 is a similar view of FIG. 14, showing the end jumper to join the conductors passing through the insulation tubes.

FIG. 16 is an isometric view of the conductor wiring arrangement

DETAILED DESCRIPTION OF INVENTION

Figure 1:
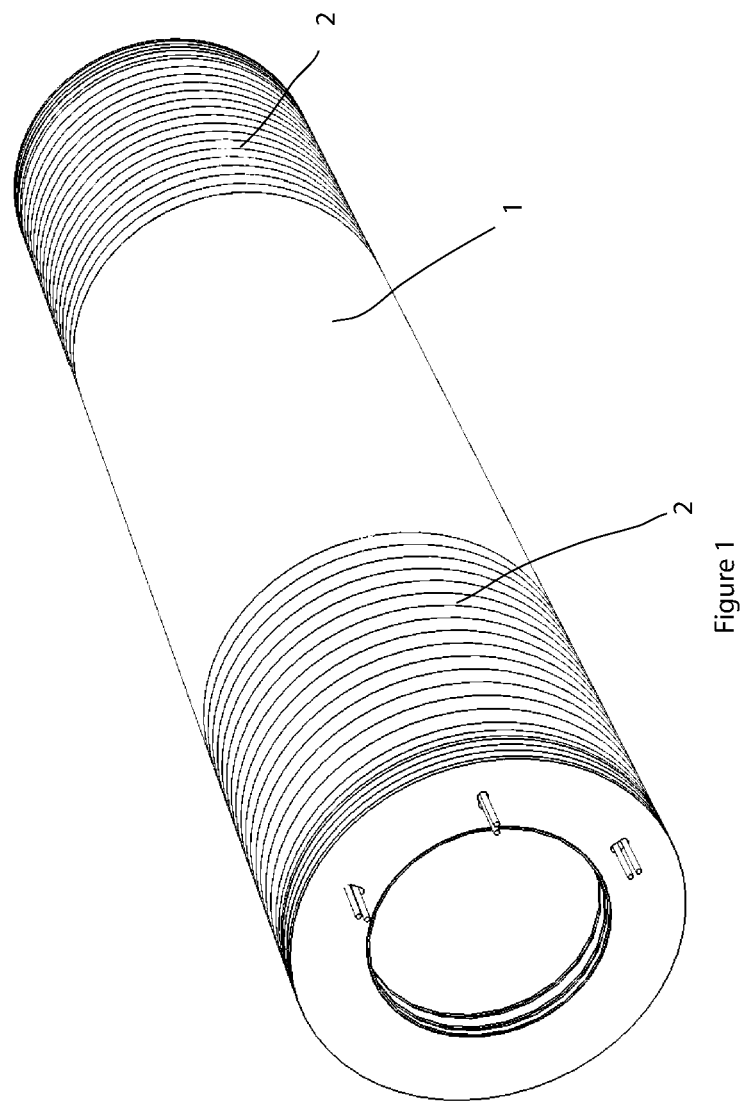
FIG. 1. is an isometric view of the motor technology

Referring to FIG. 1 there is shown a stator construction consisting of a stack of motor laminations 1 with two stacks of ceramic insulated end turn laminations 2 located at both ends of the series conventional laminations 1.

Referring to FIG. 6, the motor laminations 1 are of a generally conventional one-piece arrangement, made for example from sheet steel, having an outer circumferential yoke 17, with radially extending teeth 18. In this embodiment, rather than conventional discreet tooth lips, the tooth lips meet to form a continuous inner annular barrier 19.

Figure 3:
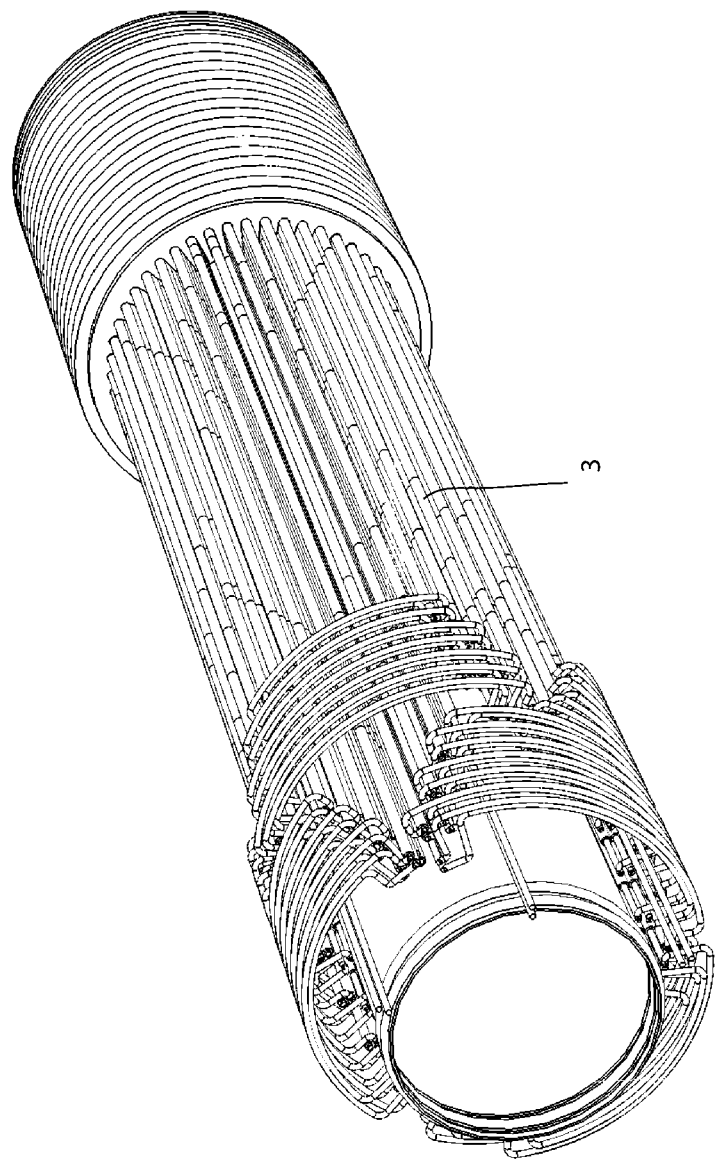
FIG. 3 is a similar view to FIG. 1, with the motor laminations and insulation laminations hidden, showing the perfect geometric arrangement of the copper winding end turn arrangement
Figure 5B:
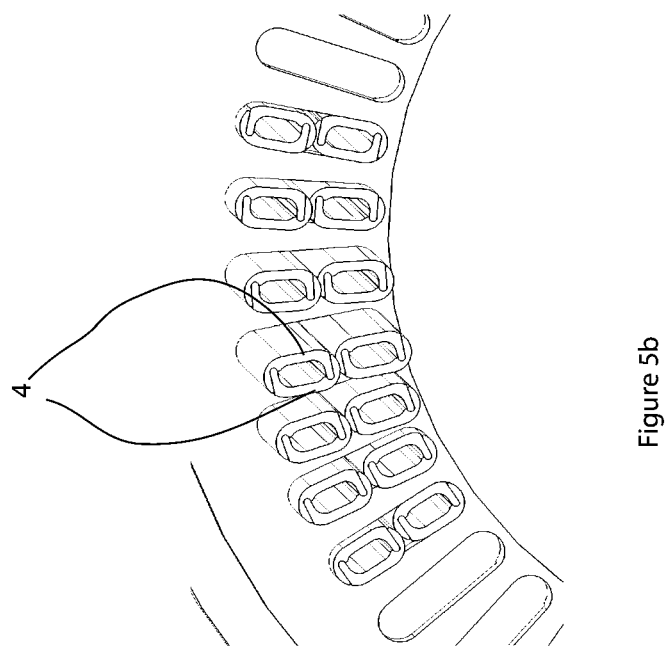
FIG. 5a,b is a ceramic insulation arrangement for the lamination slots
Figure 5A:
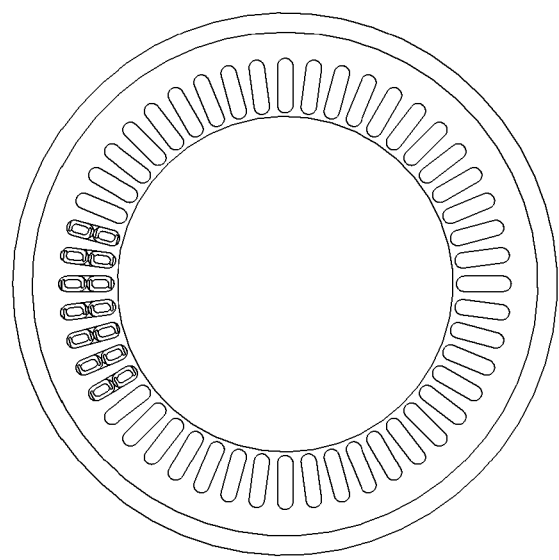

The conductors of the windings are then disposed in slots 6 and insulated in various ways. Referring to FIG. 3, each conductor is threaded through a ceramic tube 3, and each ceramic tube is inserted into the slots 6 of FIG. 6.

Alternatively, the ceramic tube may be formed of separate pieces. Referring to FIGS. 8 and 9, conductors 25 may be threaded through or encased in two part interlocking ceramic extrusions 4, 5. These are then inserted into slots 6 of the lamination 1 of FIG. 6, as shown in FIG. 7.

Figure 13:
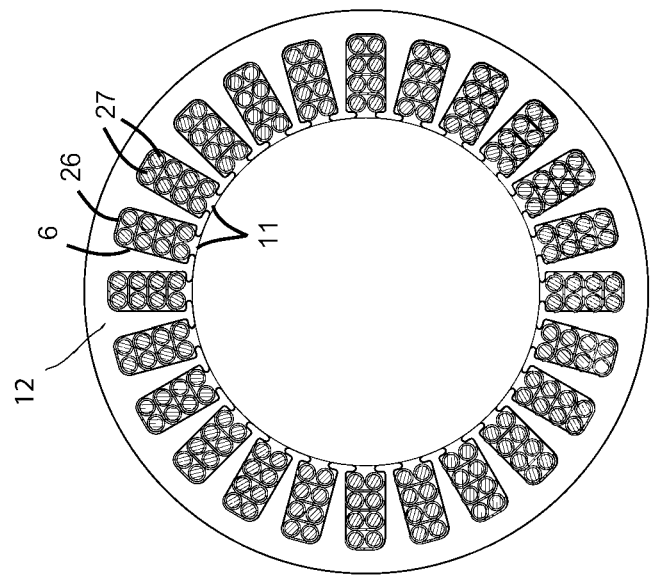
FIG. 13 is a similar view to FIG. 12 with the slots filled with copper conductors and a sandwich stack of ceramic insulation
Figure 12:
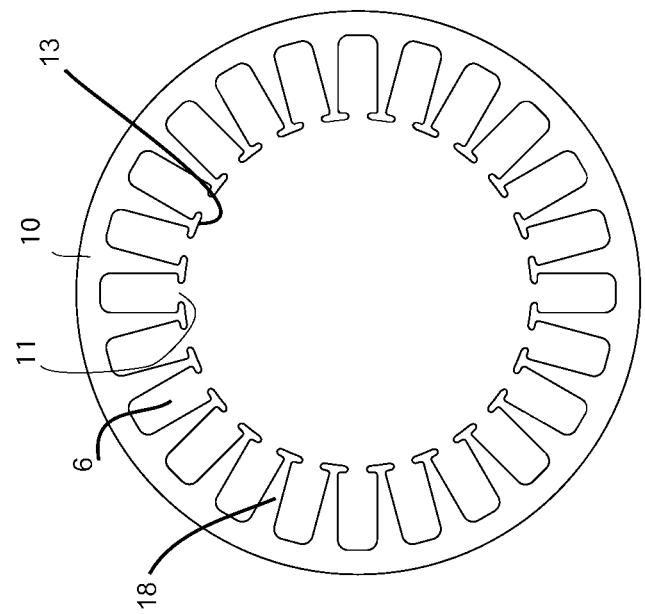
FIG. 12 is an end view of an alternative lamination
Figure 13A:
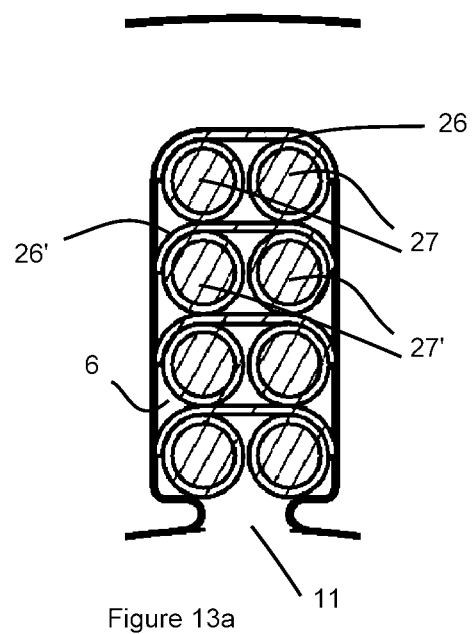
FIG. 13a is a detailed view of the a single slot shown in FIG. 13

FIG. 12 shows another one piece lamination sheet 1, here showing the slots 6 open to the bore, the teeth 18 having discreet tooth lips 13 which define gaps 11. This allows each conductor wire to be dropped into the slot and sandwiched between ceramic insulated extrusions 12 as shown in FIG. 13. Referring to FIG. 13a, firstly a curved ceramic insulator section 26 is inserted into the slot 6. This could be by sliding it longitudinally, or it could be by orienting it so it can fir through the gap 11, sliding it radially, and rotating it once it is in the slot 6. Once the first curved ceramic insulator section 26, a pair of conductors 27 may then be dropped into the slot 6 through the gap 11 to abut the curved ceramic insulator section 26. A second curved ceramic insulator section 26' is then inserted in the same manner, until the slot is filled with conductors interposed with ceramic insulator sections.

This arrangement allows the winding process to be automated, although the packing arrangement may be magnetically less efficient and generate more losses. It is also worth noting that the sandwich ceramic layers join together in such a way as to have a tortuous path to minimize tracking or shorting to earth. For example, provided the insulation section retains its integrity, for the adjacent conductive pairs 27, 27' to track, a conductive path would have to follow a path along the surface of the insulation section 26' to the edge of the slot 6.

The winding path of the motor is provided by each longitudinally extending conductor being electrically connected at its end to another longitudinally extending conductor, to provide an electric path in the manner of a wound wire, the end connection between two conductor being termed an end turn.

Figure 2B:
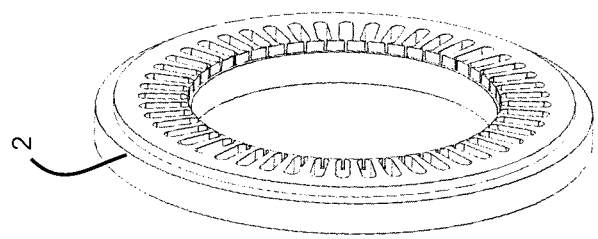
FIG. 2a,b are isometric views of ceramic insulation lamination layer
Figure 2A:
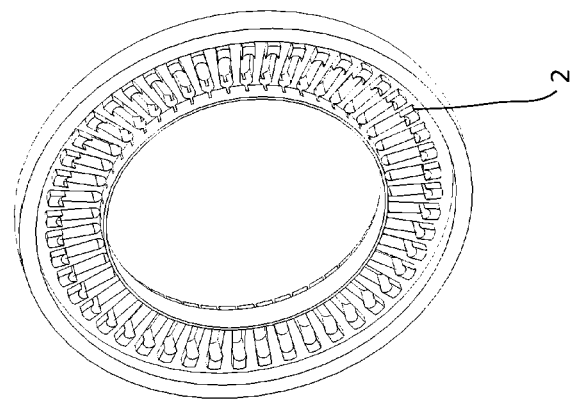
Figure 11:
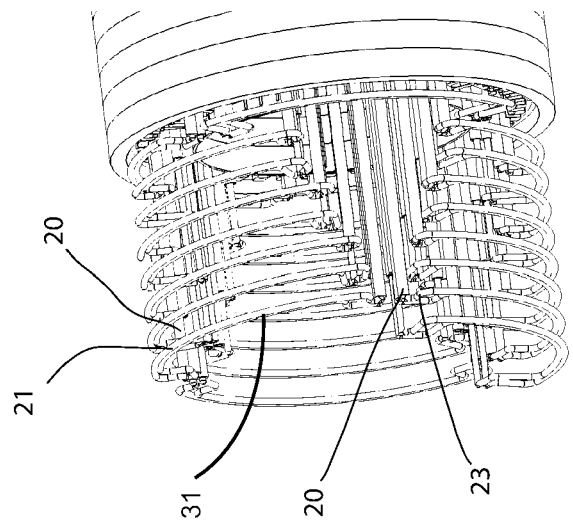
FIG. 11 is a similar view to FIG. 10 with several of the ceramic insulation laminations hidden to highlight the routing of the copper conductors and where the different lengths of the insulation tubes terminate
Figure 10:
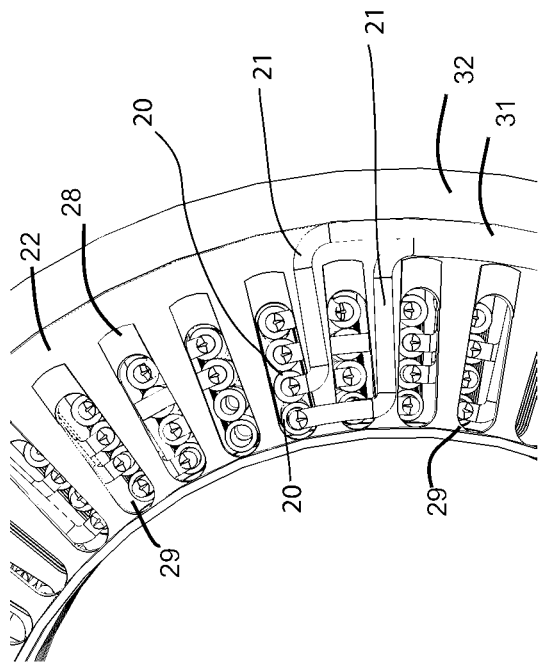
FIG. 10 is an isometric view of and end turn in a ceramic insulation lamination

Referring again to FIG. 1, and also FIGS. 10 and 11, at each end of the motor laminations 1, end turn ceramic insulation layers 2 are stacked to support each end turn. Referring to FIGS. 2a and b, each end turn ceramic insulation layer is similar in shape to the motor lamination, of a generally annular form with a through bore for the rotor, and radial slots 39 which here are not open to the bore. Each of the radial slots includes a liner support 28, these liner supports generally defining a circumferential recess 22 between the liner supports and a rim 32 of the end turn conductor 2.

At the termination of the straight ceramic liner 20, the conductor 21 (which may for example be copper wire) extends radially outwardly, before extending in an arcuate section 31 situated in the circumferential recess 22. In this case, two adjacent conductors 20 are both radially directed, before running side-by-side 31 along the recess 22. These two conductors carry the same voltage, so there is no voltage difference between them and tracking is not an issue.

Referring to FIG. 11, the conductor 31 turns radially inwards at 23 before leading into the appropriate return slot into which the copper wire is then fed back into the ceramic tube lining 20 in the lamination which then goes to the other end of the motor. This process is repeated until the wires complete the winding circuit show in FIG. 18, where the end turn arrangement for each insulation layer 2 is identified by the letter a,b,c,d,e,f,g,h,i,j,k,l,m,n, and o which correspond to the identifiers shown in FIG. 4. The slot identifiers of the top axis of FIG. 18 correspond to the lamination slots in FIG. 6 (or equally FIG. 17 described below). In this embodiment, 24 slots are present in the motor laminations 1 and the ceramic insulation layers 2; each slot housing two pairs of conductors. The 24 slots are number 1 to 24 for conductors in the first position, and 25 to 48 for the second position. The ceramic layers of the conductors 20, 21, 22, 23 and the ceramic insulation lamination layer 2 both insulates the conductors from the other phases and from subsequent end turns.

FIG. 3 shows a complete wired motor with both the motor laminations 1 and one set of insulation layer laminations 2 removed to show the end turn connection arrangement of the ceramic conductor layers of the completed wiring process. FIG. 4 shows the same completed wired motor with both insulation layer laminations 2 removed.

Figure 18:
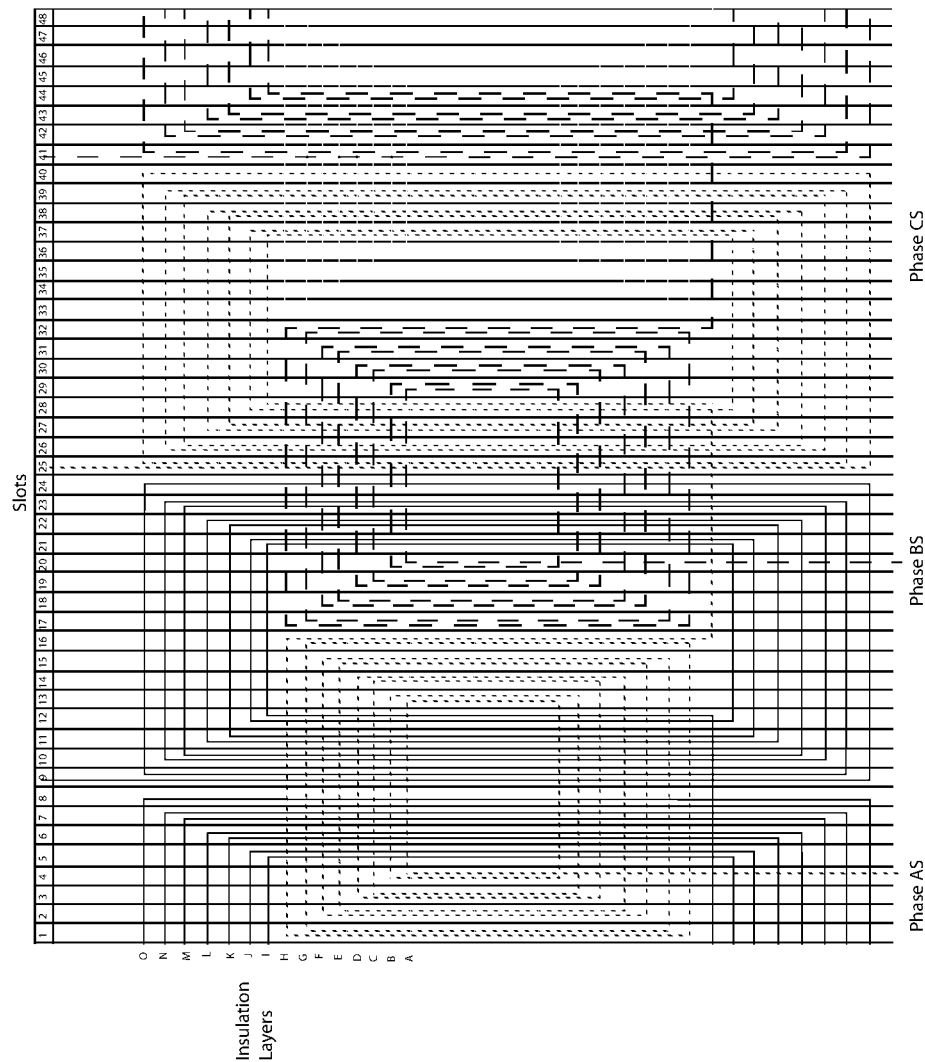
FIG. 18 is a wiring diagram for a 48 slot 3 phase motor
Figure 21:
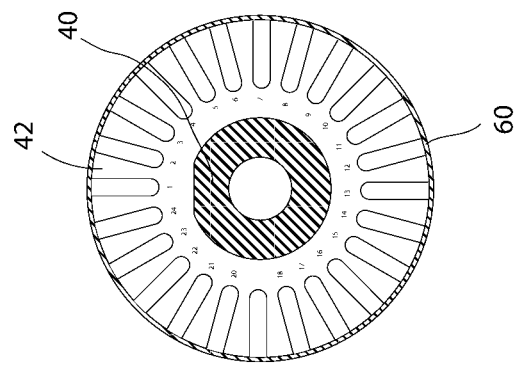
FIG. 21 is an end view of the stator of the motor shown in FIG. 20
Figure 20:
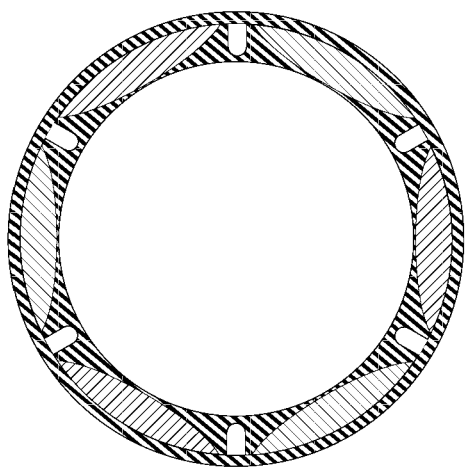
FIG. 20 is an end view of the rotor of the motor shown in FIG. 19

The winding arrangement shown in FIG. 18 shows three separate winding circuits suitable for a three phase supply; single phase or other arrangements could be implemented in the same manner.

Once the conductors and all the end turns are completed, the free space can may be left void and hermetically sealed, or the void space filled with magnesium oxide, to provide additional insulation and mechanical support for the external housing if it is subjected to very high external pressure as is would be the case if the winding were used in a motor and deployed in a well.

Referring to FIGS. 14 to 16, there is shown an alternative construction with a conductor 80 having a stadium (or discorectangular) section, which fits inside a matching shaped ceramic insulated tube 81. The clearance between the two is sufficient at room temperature, such that when it is at operating temperature the conductor is still loose, thereby not exerting any tensile force on the ceramic tube. At one end of the lamination stack the conductor is attached to a conductive linking member, formed into a U shape 82, connected with a curved 90 degree dogleg clip 83 so that it may occupy the annular space 84. The dogleg clip 83 may hook onto the insulation tube 81, so that the U shape linking member is retained by the resilience of the linking member and clip 83. At the opposite end, the conductor again is formed and in a similar shape 85 covered by a linking member which connects this U shaped conductor to the next and so on. The connection method could be welding. It will be appreciated that each U shape is specific to the slots it is connecting and the length has to match the layer it corresponds to.

Referring to FIGS. 17, and 19 to 23, there is shown an alternative winding arrangement, know as an outside-in or outer-rotor motor. i.e. the inside is stationary or the stator and the housing with the magnets rotates, which is on the outside. The benefit of this arrangement is that the conductor wire is laid in from the outside, and lends itself more an automatic winding system.

Figure 17:
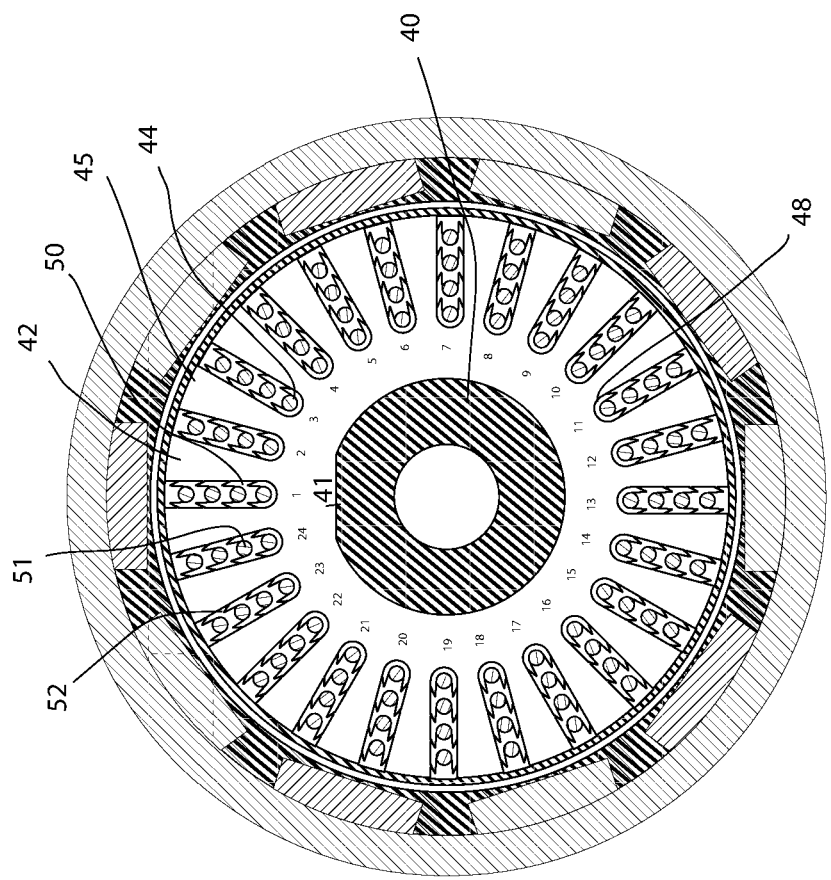
FIG. 17 is an end view of an alternate motor construction

Referring first to FIG. 17, a generally cylindrical central mandrel 40 has a flat face 41 machined onto it along its length, which is used to orientate the laminations 42 (shown separate from the outer rotor in FIG. 21) which are stacked onto the mandrel and retained.

Figure 22:
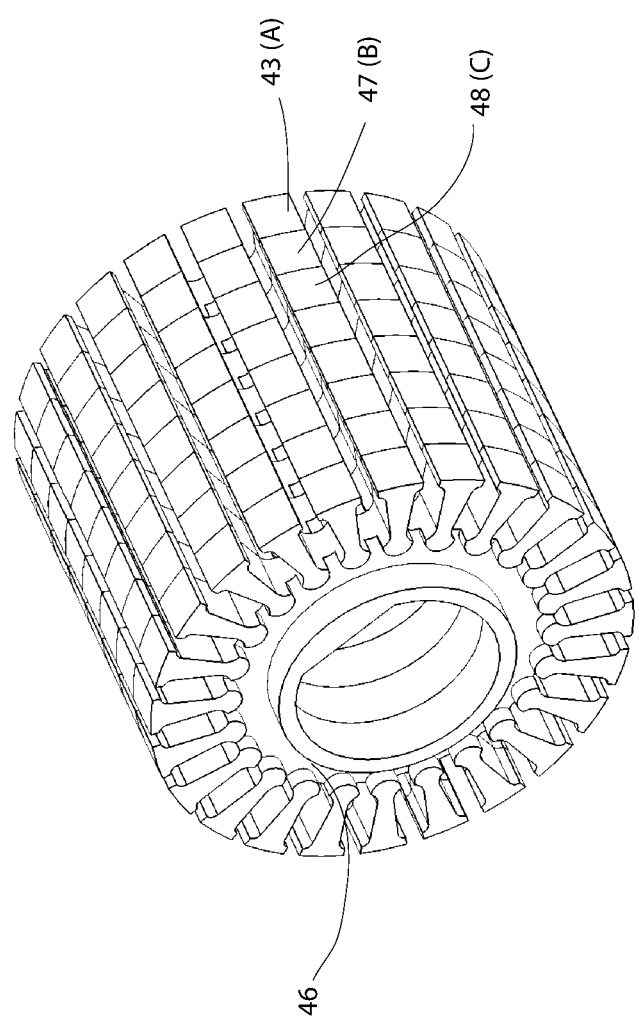
FIG. 22 is an isometric view of the ceramic insulation laminations used in the motor shown in FIG. 20
Figure 23:
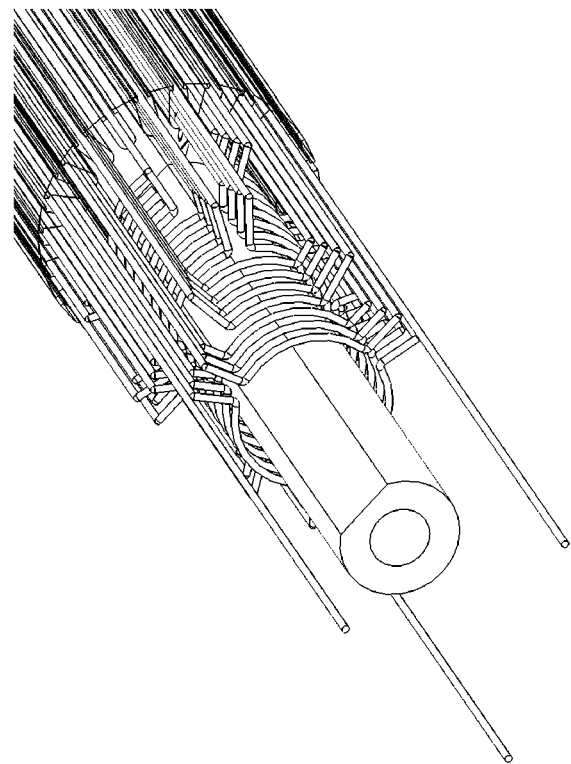
FIG. 23 is an isometric view of the copper conductor end turns of the motor shown in FIG. 20 with the laminations and ceramic end turn laminations hidden.

Referring to FIG. 22, this shows a stack of end turn insulation laminations on the mandrel 40, which is placed at one end of the stack of laminations 42, a similar stack of end turn insulation laminations being placed at the opposite end of the stack of laminations 42.

During assembly, a first insulation ceramic layer 43 which corresponds to end turn A, is placed against the stack of stack of laminations 42. In the lower part (i.e. the radially innermost part) of the slots to have a length of conductor fitted in them, ceramic insulation horse shoe shaped extrusions 44 are placed. The horse shoe shaped extrusion 44 extend the length of the assembled stacks to the outer face of ceramic end lamination 43. The first slots to have conductors fitted might be slots 2, 6 and 10 of lamination 42. The conductors 45 are laid in the horse shoe extrusions 44 along the entire length of the stack that has been assembled at that point. At the end turn of the three conductors, each conductor is laid in the annular recess 46 of insulation ceramic layer 43 (the annular recess 46 of a later insulation ceramic layer being indicated as the recess of insulation ceramic layer 43 is not here visible) and then directed back through slots to return along the assembled stack. The first return slots could be slots 7, 11, and 15.

Horse shoe shaped extrusions 44, 50, 51, 52 are laid along the length of each slot prior to a conductor being laid in that slot, so that each conductor is sealed between horse shoe shaped extrusions radially above and beneath the conductor, and the conductors are insulated from each other.

As each new set of conductors is laid down in the slots, a further insulation ceramic layer 43, 47, 48 (corresponding to end turns A, B, C) is added to the end of the stack where the conductors are to have their end turns formed. The horse shoe shaped extrusions 44, 50, 51, 52 vary in length so that they extend the full length of the stacks assembled at the time when a particular horse shoe shaped extrusion is being installed.

Figure 19:
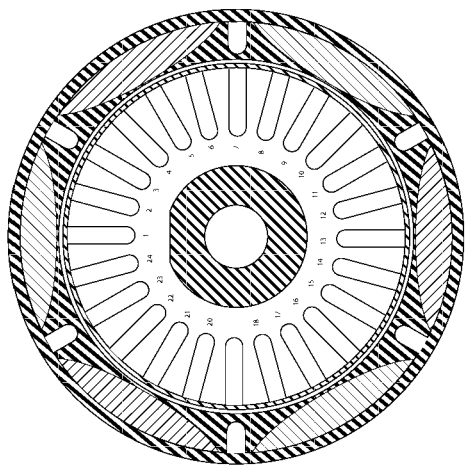
FIG. 19 is an end view cross section of further motor construction
Figure 24:
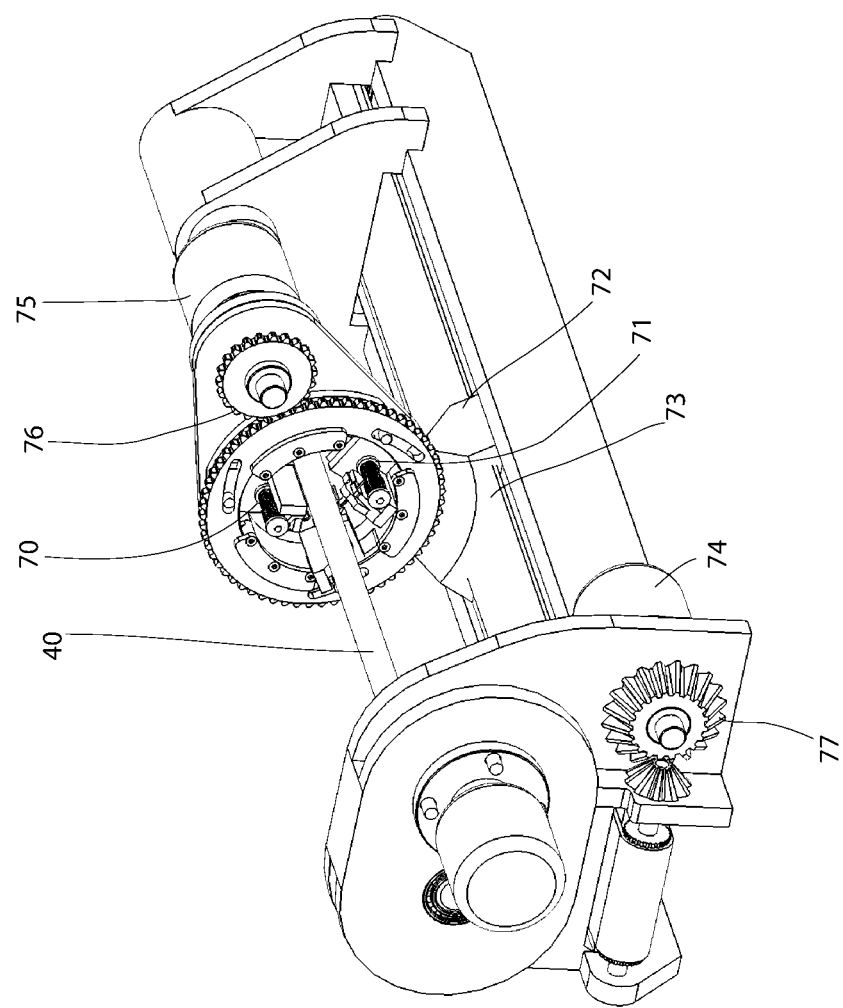
FIG. 24 is an isometric view of a automatic winding machine for the motor shown in FIG. 20.

This process is continued until the circuit diagram in FIG. 19 is achieved. FIG. 24 has had all the components hidden, which the exception of the mandrel and conductors, to illustrate how the end turns are stacked and separated.

Figure 17A:
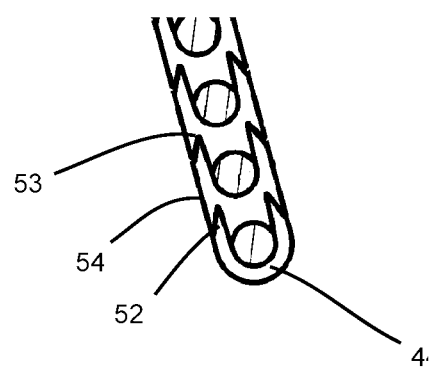
FIG. 17a is a detailed view of the a single slot shown in FIG. 17

Because the insulation around the conductor is a layered or sandwich construction, it is very important to prevent tracking. Referring to FIG. 17a, this is achieved by the providing that the ends 52 of the horseshoe shape section are pointed V-shape, the apex of the point being spaced away from the surface 52 of the wall of the slot, while the lower surface of the next horseshoe shape section 53 has a corresponding V-shaped recess 53. This creates a torturous path between adjacent conductors, which reduces the likelihood of tracking. In addition, ceramic adhesive may also be used to seal these faces.

Once the winding process has been completed, a thin wall non magnetic tube 60 maybe placed over lamination assembly and swaged onto the assembly to form a snug fit, at each end forming a metal to metal seal on bearing supports. This hermetically seals the laminations. If additional insulation is required or the void space needs to be filled, then magnesium oxide powder is metered into this area via sealable filling ports (not shown)

The outer surface of this tube 60 may also be machined with small raised surfaces along its length, then the entire tube is coated in a diamond bearing material which in effect provides distributed bearing surface along the entire lamination stack length.

Referring to FIG. 24, there is shown an automatic winding machine which automates the process described above. The mandrel 40 is on the central axis of the machine. The 3 phase conductors 70 are mounted at the appropriate angular position on a rotating disc 71 which fits around the mandrel. This rotating head sits on a saddle 72 which is moved along the mandrel axis by a belt 73 powered by a motor 74 via a gear drive 77. When the end turn wiring is being arranged in the ceramic end lamination to form the length of conductor that connects two longitudinal lengths of conductor, the rotating head 70 is rotated the required angle by the electric motor 75 via a gear or belt arrangement 76.

Referring to FIGS. 26 and 27, the lamination stack 99 is shown after being coated with a ceramic layer 100, this provides an electrical insulation layer on all surfaces. In addition, the electrical wire 101 is ceramic coated and installed in the slots as described earlier.

The use of ceramics for the end turn laminations, axial channels and other members, in all the embodiments, is particularly suitable for their insulating and temperature resistant properties. Nevertheless, other materials, such as composite materials and polymers, may also be suitable, provided they adequate provide insulating and temperature resistant properties. Both components may be formed by injection moulding. The axial channels could be provided by stiffened insulting paper.

The invention claimed is:

1. A stator having a field winding, the winding comprising a plurality of axial conductors connected at their ends to form at least one circuit with a number of turns, each axial conductor, or set of axial conductors having a voltage, being threaded within a ceramic tube, the ceramic tube being inserted into a slot provided in a stack of laminations and insulating the axial conductors from the stack of laminations.

2. A stator according to claim 1 wherein the axial conductors and the ceramic tubes are radially distributed at equal angles.

3. A stator according to claim 1 wherein the position of the axial conductors and the ceramic tubes is predetermined.

4. A stator according to claim 1 wherein the axial conductors and the ceramic tubes are arranged in concentric circles.

5. A stator according to claim 1 wherein a through bore is provided along the central axis.

6. A stator according to claim 1 wherein the ceramic tubes are longer than individual laminations.

7. A stator according to claim 1 wherein the ceramic tubes are formed from interlocking axial parts.

8. A stator according to claim 1 wherein the ceramic tubes are U-shaped.

9. A stator according to claim 1 wherein the ceramic tubes are stackable and/or interlocking.

10. A stator according to claim 1 wherein the ceramic tubes are formed from a temperature resistant material.

11. A stator according to claim 1 wherein the axial conductors being joined in pairs by a connection at their ends to form at least one circuit with a number of turns, the connection between pairs of the axial conductors being provided by a plurality of discs formed of insulating material, each disc having geometric path provided to connect one or more pairs of axial conductors.

12. A stator according to claim 1 wherein the axial conductors being joined in pairs by a connection at their ends to form at least one circuit with a number of turns, the connection between pairs of the axial conductors being provided by shaped conductor members, with potting material being provided around the shaped conductor members.

13. A stator according to claim 1 wherein the axial conductors and conductive end turn paths are formed from a continuous conductor threaded through the stator and around end turn discs.

14. A stator according to claim 1 wherein the axial conductors and conductive end turn paths are welded together.

15. A stator according to claim 1 wherein the axial conductors and/or conductive end turn paths are braided wire.

16. A stator according to claim 1 wherein the axial conductors and/or conductive end turn paths are copper clad steel.

17. A stator according to claim 1 wherein the axial conductors are configured into three circuits and employ three phase power.

18. A stator according to claim 1 wherein any voids are potted.

19. A stator having a field winding, the winding comprising a plurality of axial conductors connected at their ends to form at least one circuit with a number of turns, the axial conductors being joined in pairs by a connection at their ends to form at least one circuit with a number of turns, the connection between pairs of the axial conductors being provided by a plurality of discs formed of insulating material, each disc having a passage for the conductor to follow, electrically isolating it from any other end turn wire or winding phase, each axial conductor being threaded within a ceramic tube that is inserted into a slot provided in a stack of laminations and insulating the axial conductors from the stack of laminations.

* * * * *